United States Patent
Hermens et al.

(10) Patent No.: US 6,902,343 B2
(45) Date of Patent: Jun. 7, 2005

(54) ELEMENT FOR FIXING PLATES

(75) Inventors: Ulrich Hermens, Aachen (DE); August Dederichs, Aachen (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/381,201

(22) PCT Filed: Oct. 1, 2001

(86) PCT No.: PCT/FR01/03024
§ 371 (c)(1),
(2), (4) Date: Mar. 27, 2003

(87) PCT Pub. No.: WO02/29173
PCT Pub. Date: Apr. 11, 2002

(65) Prior Publication Data
US 2004/0037618 A1 Feb. 26, 2004

(30) Foreign Application Priority Data
Sep. 30, 2000 (DE) .......................... 100 48 573

(51) Int. Cl.⁷ ................................. F16B 5/00
(52) U.S. Cl. ..................... 403/131; 403/144
(58) Field of Search ............... 403/122, 127, 403/131, 144

(56) References Cited
U.S. PATENT DOCUMENTS

| | | | |
|---|---|---|---|
| 2,274,417 A | 2/1942 | Morris | |
| 2,545,406 A | * 3/1951 | Friend | 403/129 |
| 2,614,873 A | * 10/1952 | Booth | 403/129 |
| 3,968,975 A | * 7/1976 | Herbenar | 403/129 X |
| 4,334,795 A | 6/1982 | Westphal | |

FOREIGN PATENT DOCUMENTS

| | | |
|---|---|---|
| DE | 21 02 270 | 8/1972 |
| DE | 298 07 905 | 7/1998 |
| DE | 197 49 634 | 6/1999 |
| DE | 299 23 385 | 8/2000 |
| FR | 2 634 839 | 2/1990 |
| FR | 2 676 768 | 11/1992 |

* cited by examiner

Primary Examiner—John R. Cottingham
(74) Attorney, Agent, or Firm—Oblon, Spivak, McClelland, Maier & Neustadt, P.C.

(57) ABSTRACT

An element for fixing or a fastener for plates, particularly for sheets of glass, which includes an elongate pivot to be fixed to a framework and which has a free end and a hollow housing the free end in a moveable way. Tilting movements of the longitudinal axis of the pivot in the hollow housing are possible. The free end of the pivot is introduced with limitable axial mobility into a bore of an articulation element pivotably supporting the pivot in the hollow housing. The articulation element may be in the form of a ball and of an elastic sleeve element.

33 Claims, 2 Drawing Sheets

ELEMENT FOR FIXING PLATES

Figure 1:
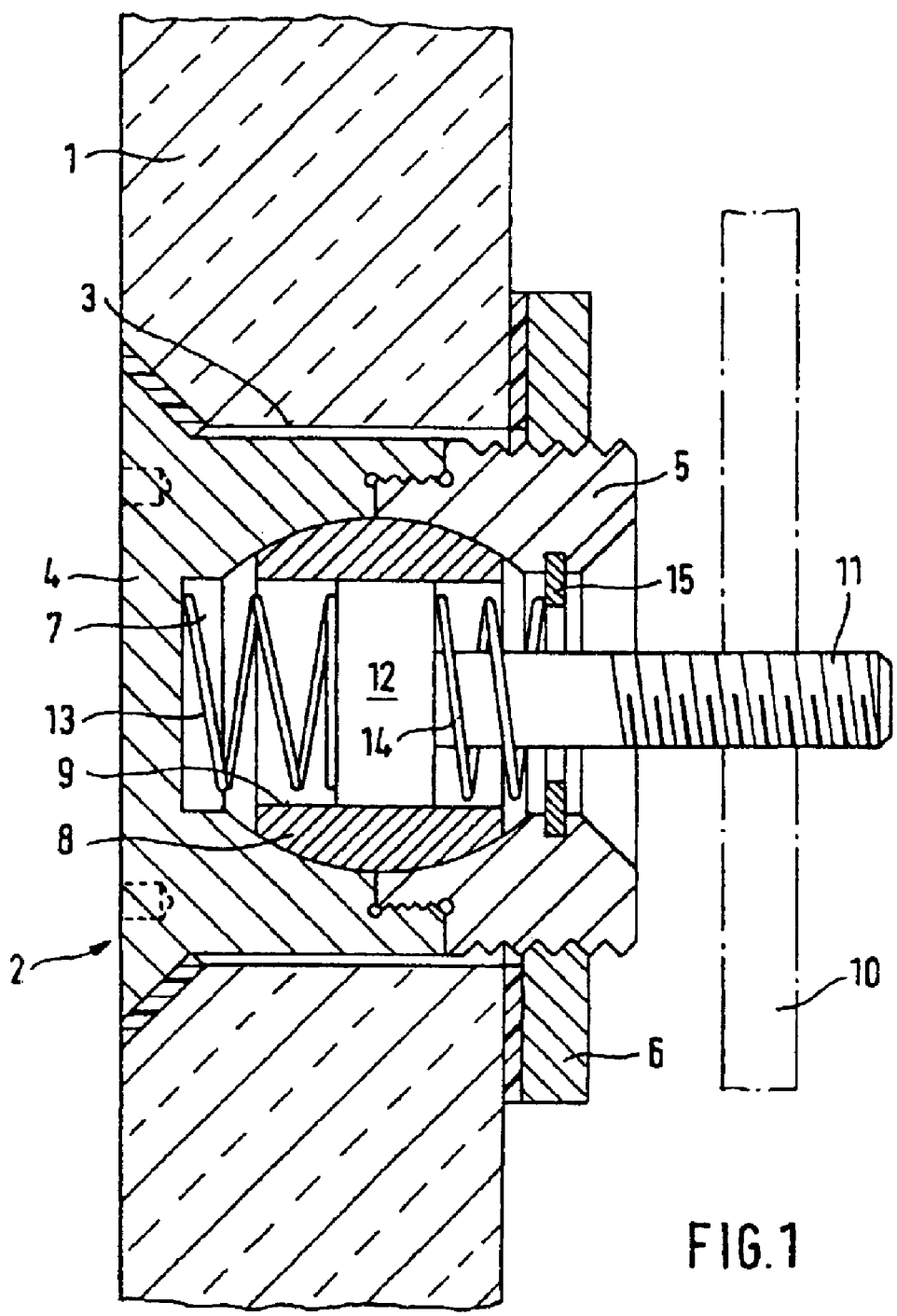

The invention relates to a element for fixing plates (or a fastener), particularly for sheets of glass, which comprises an elongate pivot to be fixed to a framework and which has a free end and a hollow housing housing this free end in a moveable way, in which fastener an articulation element which pivotably supports the pivot in the hollow housing allows tilting movements of the longitudinal axis of the pivot in the hollow housing.

To attach rigid plates, for example plates of glass, to fixed frameworks, such as the facades of buildings for example, it is generally known practice for these plates to be hung from individual points using fasteners (also known as "point attachments"), which offer various degrees of freedom of movement in rotation and in translation. The degrees of freedom in rotation are mainly achieved by means of ball joints, while the degrees of freedom in translation are provided by floating bearings. Thus, the plates may bend elastically slightly, on the one hand, under the effect of the loads applied, for example, the force of the wind, and, on the other hand, in particular, different thermal expansions of the plates and of the framework can be compensated for practically without load.

DE-A1-197 49 634 describes a fastener in which the free end of a pivot housed moveably in a hollow housing consists directly of a ball and thus allows tipping movements of the longitudinal axis of the pivot. The hollow housing itself is essentially in the form of a hollow cylinder and therefore also allows the pivot to move in the axial direction, compressing springs arranged on each side of the sphere portion in the axial direction limiting this axial mobility. The part of a plate fixed to a framework by means of this fastener can not only experience tilting or curving movements but also deflections normal to the surface of the plate. A definite disadvantage with this construction is that the spherical surface of the end of the pivot slides directly on the walls of the hollow accommodating housing.

DE-A1-198 00 614 describes another fastener, which comprises a hollow spherical element arranged pivotably in a hollow accommodating housing. At the middle of this housing is the free end of a pivot mounted with radial play. This configuration makes it possible to compensate for dimensional variations between the position of the pivot in the plate that is to be fastened and the corresponding accommodating part in the framework. A possibility of axial translation of this free end in the mounted situation is not, however, envisaged here, because the free end of the pivot is screwed securely to the spherical articulation (ball joint) after radial positioning.

DE-A1-197 13 678 also discloses a fastener with a pivot and a hollow housing to be installed in bores in sheets of glass. Here too, there is compensation for tolerances in the direction orthogonal to the longitudinal axis of the pivot. Two elastomeric rings surrounding the pivot inside the hollow housing limit the mobility of the pivot in the axial direction. Admittedly, mobility of the pivot purely in translation is shown, but rendered possible only by compressing an elastomeric ring around its entire perimeter.

EP-B1-0 655 543 discloses a fastener that can be applied in the case of plates, particularly plates of glass, in which a combination of a hollow bucket-shaped housing with a head like that of a piston at the free end of a pivot replaces a ball joint articulation. The hollow housing is in a fitting fixed to the associated plate, while the pivot is attached fixedly—or with the aforementioned degrees of freedom in translation—to the framework. The head like that of a piston is produced with an approximately spherical lateral surface, is surrounded by the hollow housing with a small amount of radial play. In the axial direction of the pivot, it is flanked on both sides by intermediate elastic layers which, through compression, allow, on the one hand, very small axial movements but, above all, allow movements in pivoting between the hollow housing and the head or pivot respectively. This possibility of pivoting in space about the center of the head affords the degrees of freedom in rotation needed for the fastened plates to curve in any way.

EP-A1-0 863 287 discloses an alternative form of the aforementioned fastener, in which the head like that of a piston is provided, on its largest perimeter, with a plastic ring which is supposed to minimize the radial play in the hollow housing and the friction and wear between the lateral surface of the head and the interior surface of the hollow housing. For the remainder, this construction is practically identical to the earlier embodiment.

EP-A1-0 784 129 also describes a fastener for plates, particularly for plates of glass, which is supposed to allow angles to be established between the plate that is to be held and the framework. To this end, the shank of the fastener emerging from the plate is split into two in the lengthwise direction, while a threaded tenon runs longitudinally through the two parts. The two parts of the shank have end faces of hollow spherical shape. These each collaborate with a washer which, on one side, has a spherical shape with a radius suited to the hollow spherical end faces and the other side of which is flat. The parts of the shank with the corresponding washers are placed one on each side of a support element of the framework, which element is provided with a bore for the passage of the threaded tenon. By means of the latter, the parts of the shank with the washers—through which the threaded tenon passes with sufficient radial play—are joined together by screwing. Thus, the flat sides of the washers are clamped against the two flat surfaces of the support element arranged so that they are opposite. In the bore thereof, the threaded tenon also has a relatively large amount of radial play, so as to be able to be adjusted radially therein during mounting. Depending on the force of the pre-tightening, it is also possible at this point to take up the movements of compensation by translation. At the same time, the corresponding spherical shell portions make it possible, during mounting, to angularly adjust the axis of the fastener with respect to the support element. The fasteners provided with this possibility of adjustment are used mainly for hanging rigid plane plates (of glass) from walls which exhibit curvatures or breaks.

The object of the invention is to improve a fastener of this kind still further.

According to the invention, this objective is achieved with the characteristics of the independent claims 1, 2 and 11. The characteristics of the claims dependent on the respective independent claims disclose advantageous developments of these subjects. Secondary claims deal with panes provided with such fasteners and their use in the glazing of buildings.

The axial mobility of the free end of the pivot, which can be limited, is produced in a first alternative form according to the invention by the fact that a hole (bore) in a pivotably mounted spherical element is provided by way of hollow accommodating housing, in which hole the pivot can slide axially.

In a second alternative form according to the invention, an element in the form of a sleeve with at least one elastically deformable component and an internal sleeve in the aperture of which the free end of the pivot can be moved axially and can be guided in pivoting by virtue of the elastic deformation of said component is provided.

In yet another alternative form of the invention, an element in the form of a sleeve with at least one elastically deformable component to which the free end of the pivot is securely attached so that it can be guided in pivoting by virtue of the elastic deformation of said component is provided.

In a preferred embodiment of this alternative form, the elastic element is able to shear enough to allow the pivot limited axial mobility inside the fastener.

As a preference, in the alternative forms, the radial play for the radial guidance of the pivot is adjusted to the smallest possible value. It will be noted that "play as small as possible" or "minimal play" is used here in place of the common expression "without play" because, strictly speaking, parts assembled without play are not able to move one with respect to the other. In any event, it is necessary to avoid phenomena of wear, knocking noises and the like caused by excessive play, and seizure and wear phenomena caused by insufficient play.

The bore in the articulation element, housing the end of the pivot, may be produced in the form of a blind hole or of a through-hole. The axial mobility between the pivot and the hollow housing may be limited, for example by elastic interlayers or sprung elements.

The head like that of a piston (generally in the form of a thickening or increased thickness) provided in the state of the art at the end of the pivot could here be formed directly by the articulation element surrounding the end of the pivot, it being possible for axial mobility to be provided between this head and the pivot itself. In another preferred embodiment, the pivot may, as before, be provided with a fixed head or terminal additional thickness which may be slideably supported, in the manner of a piston, in the bore of the articulation element, it not being possible for the latter to become jammed in its guide with a minimum amount of radial play. If the lateral surface of this head is produced so that it is cylindrical, the radial forces are distributed over a larger area by comparison with the state of the art which have spherical heads. This results in a lower surface pressure and in a reduction in wear.

As a preference, the articulation element is formed of a ball, or of a portion of a ball, pierced or provided with a blind hole. By way of articulation element it is, however, also possible to use a sleeve or a bushing that pivots and slides axially inside the hollow housing, embedded in elastically deformable bodies, for example blocks of rubber or of plastic.

The articulation element may be made easier to fit if the part of the fitting that forms the hollow housing is split. It is, however, just as possible for a spherical element to be wedged pivotably but nonslideably in the hollow housing in a way known per se using a snap ring or the like.

Starting out from a neutral or mean position, the pivot has to be able to experience angular variations reaching, in particular, 10° with respect to the hollow housing. What is of essential importance then for the one-use model, neglecting the sizing considerations associated with the loading, is the space available in the radial direction on the sheet of glass and on the framework and the necessary thickness of the pivot and the necessary angles of pivoting in the fasteners.

Such an element, which allows the plate secured using it to deflect or curve elastically with respect to surface loadings now also in a direction normal to the plane of the plate, can be used particularly advantageously as a support point at the center or on the surface of large plates. By using the fasteners in common use at the present time, which allow no or only a small deflection travel in the normal direction, the plates are highly stressed in bending at such central or face-mounted support points, because flexing arises which is not in the same direction on all sides of the respective support point. This loading scenario is particularly lowered by a fastener produced according to the invention. Resistive or internal return forces needed to counter such movements, which may lie in the region less than or equal to ±5 mm, can be guaranteed in a preferred embodiment, by sprung elements, the preload of which can be set or adjusted. In addition, it is possible to predetermine, by means of such sprung elements, a defined neutral position (zero or rest position) of the free end of the pivot within the hollow housing. In the case of an elastic sleeve element or of equivalent elastic articulation elements, the elastic resistances to deformation may also be used to set said neutral position.

Naturally, the fasteners proposed here are also able to be used universally, in addition to such specific application scenarios, for all the other fastening points for which at least one support able to move in rotation is desired. They are thus suitable for use in a modular construction system based on unit elements.

Of course, it would theoretically be possible, with such fasteners, also to fasten multilayer laminated panes or glazing elements with spacing pieces (insulating glazing) right down to fire protection glazing and plates made of other materials such as ceramic, stone, plastic, metal etc. to frameworks with the desired degrees of freedom. It is also possible to conceive of manufacturing the fastener itself out of high-strength non-metallic materials or composites.

Because the mobilities of the fastener are now separated into degrees of freedom in rotation and in axial translation, the wear on such a device is reduced to the inevitable minimum level. This also, by comparison with the relevant state of the art, results in many more possibilities for optimizing the flexibility of the pivot in the axial direction.

Other details and advantages of the subject of the invention are illustrated by the drawing of two exemplary embodiments and by their detailed description which follows.

Figure 2:
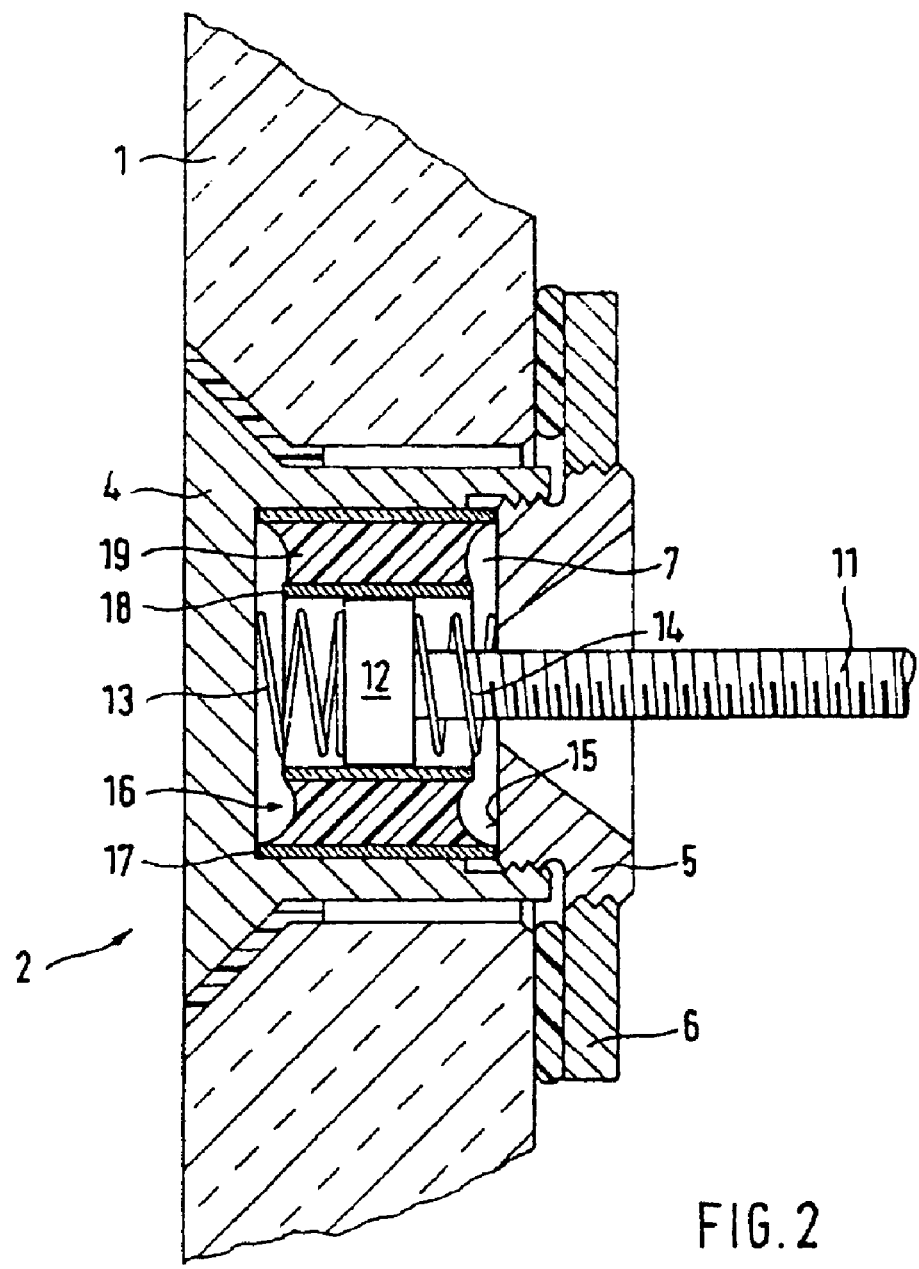

In these drawings, which constitutes schematic depictions in section,

FIG. 1 shows a first embodiment of a fastener (or point attachment) for plates with a pivot pivoting and slightly movable in the axial direction and an articulation element in the form of a perforated ball; and FIG. 2 illustrates a second form of embodiment in which the articulation element is in the form of a metal-elastomer sleeve.

It needs to be emphasized from the outset that, in that which follows, the terms "outer" and, respectively, "on the outside" each time denote the side of the fastener or, respectively, of the surrounding construction elements, which is generally free situated on the opposite side to the framework, and that the terms "inner" and "on the inside" each time denote their side that faces towards the framework. The framework may, for example, be arranged at a facade or an interior wall of a building, at a bridge or the like.

According to FIG. 1, a fastener 2 is fixed to a monolithic pane 1 in a through-bore 3 of the pane 1. It comprises an external fitting part 4, which, in the mounted position, lies flush with the face facing towards the outside of the pane 1, and an internal fitting part 5 which is assembled with the external fitting part 4 in a separable or non-separable way.

Here is indicated the screw-fastening of these two parts along a parting line. The external fitting part 4 bears via a countersunk conical head and a corresponding bearing ring made of plastic against the pane 1 in the conical outer end region of the bore 3. Starting from the other side of the pane 1 there is screwed onto the internal fitting part 5, or onto its body provided with an external screw thread, a nut in the form of a washer 6, which bears against the inside of the pane 1—also with the insertion of a plastic washer. The intermediate layers in the known way prevent direct contact between the material of the fastener, which is generally a metal, and the glass.

The method by which the fastener 2 is fastened to the plate or to the pane 1 is not, however, important here. The arrangement shown is merely one nonlimiting example. Other alternative forms of embodiment are described abundantly in the prior art. It will be mentioned in particular that it is not absolutely essential to have a bore passing through the pane or through other plates that are to be fastened.

The two fitting parts 4 and 5 together form a hollow housing 7 separable along the aforementioned parting line. An articulation element 8 in the form of a pierced (perforated) ball with a through-bore 9 is introduced into this housing in such a way that it can pivot freely with as little radial play as possible. In this embodiment, the center of pivoting lies, in a way known per se, inside the thickness of the pane 1 that is fastened with the fastener 2. Other arrangements of the center of pivoting outside the pane 1 or even flush with its interior surface may, however, also be provided if need be; to do that, the configuration of the assembly of the fitting parts and possibly the way in which they are secured to the pane needs simply to be altered.

Naturally there are other means of incorporating an articulation element into a hollow housing provided for that purpose and for securing it axially there into; these need not be excluded here. The only thing of importance is the freedom of pivoting in the hollow housing of the pivot used in the articulation element.

To assemble the fastener 2 in addition to the pane 1 with a framework 10 simply indicated here in chain line with a support portion, there is a pivot 11 which extends through a hole in the support portion as far as the hollow housing 7, and respectively into the bore 9 of the articulation element 8. At its free end situated in this bore, the pivot 11 carries a thickening (head) in the form of a piston 12. This head is housed in the bore 9 so that it can slide without jamming with the smallest possible amount of radial clearance (sliding fit). When choosing the fit, it is necessary naturally to take account of the possible thermal expansions and during the bearing of the articulation element.

To determine a defined neutral or mean position and to limit the axial mobility of the additional thickness 12 inside the bore 9, pressure springs are provided on both sides of the head 12. The outer spring 13 bears in the radial direction on, on the one hand, the outer front face of the head 12 and, on the other hand, in the external fitting part 4 on the inner end of the hollow housing 7. It may be possible to provide appropriate means for centering the outer spring 13 with respect to the central axis of the fastener, although these are not depicted here.

The inner spring 14 surrounds the shank of the pivot 11 with a large amount of radial play. It bears axially on the one hand against the inner front face of the head 12 and, on the other hand, against an annular shoulder 15 provided in the inner fitting part. The latter may, for example, be produced, as depicted here, dismantably in the form of a snap ring inserted in a groove in part of the inner fitting 5, if such a solution is capable in complete safety of reacting all the forces exerted in the axial direction. Of course, other solutions relating to constructional details are also possible here, without altering the principle of the head in the articulation element and the fixing of its axially moveable position. Thus, instead of the helical pressure springs depicted here, it is also possible to use other appropriate elastic elements, for example elements made of flexible rubber or plastics materials, to define the neutral position of the additional thickness in the bore.

The elasticities, or spring stiffnesses, available may also be obtained by using springs of different hardness. It is also possible to envisage modifying the preload of the press springs as needed after they have been mounted, using adjusting means, for example adjusting screws in the fastener itself. Such a solution would, however, be more costly than the outline depiction shown here. In an extreme case, the hardness of the springs may, if necessary, be set to be so high that only very small movements of axial deflection are possible and a practically fixed axial support is then produced. The fundamental axial mobility of the element is no longer, however, assured in such a case.

If, in an alternative which has not been depicted, the bore made in the articulation element has to be a blind hole, then the outer spring 13 may bear against the bottom of this hole. It is also possible to provide in a through-bore a bearing shoulder against which the outer spring 13 can also bear inside the articulation element.

The inner spring may also, in an alternative form of the depiction of FIG. 1, bear inside the articulation element, if enough mounting space is present and if a bearing shoulder or the like is provided. In such a design, the springs 13 and/or 14 should not be deformed elastically by movements of pure pivoting of the fastener.

The fastener 2 described here may be completely prefitted onto the pane 1. For example, the articulation element 8 and the outer spring 13 are first of all introduced into the outer fitting part 4. Next, the pivot 11 with its increased-thickness head 12 is inserted into the bore 9 of the articulation element 8. The inner spring 14 is next placed on the head 12. Finally, the internal fitting part 5 with the annular shoulder 15, therefore in this instance the snap ring 16, is fitted and assembled on the outer fitting part, in this instance by screwing. Thus, on the one hand, the articulation element is immobilized in the hollow housing and preferably an appropriate combination of materials, a sliding coating and/or lubrication for life ensure long-term mobility of free pivoting of the articulation element. On the other hand, the two springs are preloaded in the desired way and the pivot 11, now housed pivotably and with axial sliding, protrudes outward. Finally, this assembly is installed from the outside into the bore 3 of the pane 1 and immobilized at the same time as the interlayers, using the nut 6.

The outside diameter of the head and the inside diameters of the bores of the articulation element and of the internal fitting part can be matched in such a way that the pivot with its end additional thickness can be introduced into the bore of the articulation element or withdrawn therefrom before the snap ring is fitted or, respectively, after it has been removed.

Before the fastener 2 is premounted, the pivot 11 is immobilized in its axial direction with respect to the framework 10 in the usual way, preferably dismantlably using appropriate screws. If need be, it is also necessary to provide it with degrees of freedom in translation radially with respect to the axis of the pivot and parallel to the plane of the support portion. The pivot 11 thus passes on to the framework 10 all the loads such as the weight and the forces due to the wind and expansions of thermal origin, etc., which are transmitted by the pane 1 to the fastener 2. Other details of this framework are not depicted here. In this respect, and for more precise details regarding the connection and the degrees of freedom in translation of the fastener for fixing to the framework, reference will be made once again to the substantial prior art in this field.

The fitting parts 4 and 5 of the fastener 2 assembled with pane 1 may in all cases pivot freely with respect to the pivot 11 by virtue of the articulation element 8, that is to say that they are supported with degrees of freedom in rotation. Usually, angles of pivoting of about 5° in all directions are considered. Thus, curvatures of the pane 1 can here be reacted and compensated for without substantial resistive force. Furthermore, the axial mobility of the head 12 in the bore 9 and the two springs 13 and 14 allow variations in the distance between the pane 1 and the framework, which variations are finally limited in this embodiment by the respective immobilizing length of the compression springs when fully compressed. The pivot and, respectively, its end additional thickness may, in this construction, be pushed in axially in both directions to greater or lesser depths within the fastener 2 starting from a neutral position, against the action of elastic return forces. In addition, the springs 13 and 14 may also exert return moments against the oscillations of the articulation element 8 in the hollow housing.

The main load on the fastener is the weight of the pane 1. In the normal mounted position, it acts perpendicularly to the longitudinal axis of the pivot. Between the cylindrical lateral surface of the head 12 and the wall of the bore 9 in the spherical element, the small amount of radial play guarantees surface contact such that the main load is transferred to the pivot by a relatively large area.

In the alternative form of the fastener which form is depicted in FIG. 2, a sleeve element 16 is used by way of articulation element 8 in place of the ball joint element, and this sleeve element is clamped between the two fitting parts of the fastener. It is made up of a radially outer bushing 17, of a radially inner bushing 18 arranged concentrically with the latter one and of an elastically deformable articulation ring 19 which is arranged in the annular slot between the two bushings. The connection between the articulation ring and the bushings, which may be made of metal or of non-metallic materials, has high strength, for example on account of bonding or vulcanization.

Elements of this nature are known per se, for example, as dampers in the field of motor vehicle chassis construction. The articulation ring may be made of rubber or of appropriate elastomers, it being possible for its elastic stiffness to be adjusted within very broad limits to suit the requirement through the choice of the materials and the geometric configuration. In the radial direction, these elements are, as a general rule, very stiff, although the inner bushing is just as able to pivot with respect to the central axis as it is to move in the axial direction with respect to the outer bushing through elastic deformation of the articulation ring.

The remainder of the structure of the fastener corresponds essentially to the embodiment illustrated in FIG. 1, which means that there is no need to explain the individual parts again here. However, the construction is markedly more simple and the manufacture is thus more economical because of the disappearance of the ball joint element. Thus, the outer bushing 18 may simply be clamped axially and radially without play in the hollow housing between the two fitting parts 4 and 5 to be screwed together. The annular shoulder 15 which acts as a support for the inner spring 14 is here incorporated directly into the internal fitting part 5. It also immobilizes the sleeve element in the axial direction via its outer bushing 18. Advantageously, the inside diameter of the shoulder 15 of the fitting part 5 is smaller than the outside diameter of the head 12 of the piston, affording mechanical safety so that the piston cannot leave the space 7. The inner bushing 19 is slightly shorter in the axial direction than the outer bushing 18. Its inner lateral surface forms the bore of the articulation element, in which the end additional thickness 12 of the pivot 11 is housed with as little radial play as possible, although it can still slide axially. Here again, it is appropriate once more to take appropriate steps to ensure the smoothness of the sliding movement.

In an alternative form, the articulation ring could be fixed directly to the outer fitting part 4, it then being possible for the outer bushing 17 to be omitted.

In another simplified alternative form, it would be conceivable, using the sleeve-shaped elastic articulation element, to fix in the axial direction the pivot with or without additional thickness to the inner bushing or to the articulation ring if the desired or required axial mobility can be obtained only by sufficient transverse movements of the articulation ring. In this alternative form, there is no need for special elastic elements for defining the neutral position of the pivot.

What is claimed is:

1. A fastener for plates, comprising:
   an elongate pivot configured to be fixed to a framework and having a free end and a hollow housing configured to house the free end in a moveable way;
   an articulation element configured to pivotably support the elongate pivot in the hollow housing to allow tilting movements of a longitudinal axis of the elongate pivot in the hollow housing;
   wherein the articulation element includes a one-piece spherical element of unitary construction pivotably mounted and provided with a bore by way of the hollow housing, in which bore the free end of the elongate pivot is supported with axial sliding with minimal radial play.

2. The fastener as claimed in claim 1, further comprising a head guided in the bore of the articulation element provided at the free end of the elongate pivot.

3. The fastener as claimed in claim 2, wherein the head has a cylindrical lateral surface.

4. The fastener as claimed in claim 1, wherein the hollow housing for the articulation element is formed of two parts of a fitting that are assembled along a parting line.

5. The fastener as claimed in claim 1, wherein provided inside the bore of the articulation element are elastic elements configured to adjust the free end of the elongate pivot into a neutral position in an axial direction of the elongate pivot.

6. The fastener as claimed in claim 5, wherein the elastic elements have a form of compression springs.

7. A fastener for plates, comprising:
   an elongate pivot configured to be fixed to a framework and having a free end and a hollow housing configured to house the free end in a moveable way;
   an articulation element configured to pivotably support the elongate pivot in the hollow housing to allow tilting movements of a longitudinal axis of the elongate pivot in the hollow housing;
   wherein the articulation element includes a one-piece spherical element pivotably mounted and provided with a bore by way of the hollow housing, in which bore the free end of the elongate pivot is supported with axial sliding with minimal radial play, wherein provided inside the bore of the articulation element are elastic elements configured to adjust the free end of the elongate pivot into a neutral position in an axial direction of the elongate pivot, wherein the elastic elements are arranged one on each side of an end head of the elongate pivot and each elastic element bears against the end head at a first side.

8. The fastener as claimed in claim 7, wherein second sides of the elastic elements bear, in a case of one of the elastic elements, against a closed end of the hollow housing and, in a case of another elastic element, against an annular shoulder surrounding the elongate pivot.

9. The fastener as claimed in claim 7, wherein second sides of the elastic elements bear against an inside of the bore.

10. A fastener for plates, comprising:

an elongate pivot configured to be fixed to a framework and having a free end and a hollow housing configured to house the free end in a moveable way;

an articulation element configured to pivotably support the elongate pivot in the hollow housing to allow tilting movements of a longitudinal axis of the elongate pivot in the hollow housing;

the articulation element includes a sleeve element with at least one elastically deformable component and an internal sleeve, in which the free end of the elongate pivot can be moved axially with minimal radial clearance and can be guided in pivoting with elastic deformation of the elastically deformable component, wherein the at least one elastically deformable component joins the sleeve element to the internal sleeve by bonding or vulcanization.

11. The fastener as claimed in claim 10, further comprising a head guided in a bore of the articulation element provided at the free end of the elongate pivot.

12. The fastener as claimed in claim 11, wherein the head has a cylindrical lateral surface.

13. The fastener as claimed in claim 10, wherein the hollow housing for the articulation element is formed of two parts of a fitting that are assembled along a parting line.

14. The fastener as claimed in claim 10, wherein provided inside a bore of the articulation element are elastic elements configured to adjust the free end of the elongate pivot into a neutral position in an axial direction of the elongate pivot.

15. The fastener as claimed in claim 14, wherein the elastic elements have a form of compression springs.

16. A fastener for elates, comprising:

an elongate pivot configured to be fixed to a framework and having a free end and a hollow housing configured to house the free end in a moveable way;

an articulation element configured to pivotably support the elongate pivot in the hollow housing to allow tilting movements of a longitudinal axis of the elongate pivot in the hollow housing;

the articulation element includes a sleeve element with at least one elastically deformable component and an internal sleeve, in which the free end of the elongate pivot can be moved axially with minimal radial clearance and can be guided in pivoting with elastic deformation of the elastically deformable component, wherein the at least one elastically deformable component joins the sleeve element to the internal sleeve, wherein provided inside a bore of the articulation element are elastic elements configured to adjust the free end of the elongate pivot into a neutral position in an axial direction of the elongate pivot, wherein the elastic elements are arranged one on each side of an end head of the elongate pivot and each elastic element bears against the end head at a first side.

17. The fastener as claimed in claim 16, wherein second sides of the elastic elements bear, in a case of one of the elastic elements, against a closed end of the hollow housing and, in a case of another elastic element, against an annular shoulder surrounding the elongate pivot.

18. The fastener as claimed in claim 16, wherein second sides of the elastic elements bear against an inside of the bore.

19. A fastener for plates, comprising:

an elongate pivot configured to be fixed to a framework and having a free end and a hollow housing configured to house the free end in a moveable way;

an articulation element configured to pivotably support the elongate pivot in the hollow housing to allow tilting movements of a longitudinal axis of the elongate pivot in the hollow housing;

wherein the articulation element includes a sleeve element with at least one elastically deformable articulation ring configured to allow the elongate pivot to tilt with respect to the hollow housing, which surrounds the free end of the elongate pivot, and contacts the housing.

20. The fastener as claimed in claim 19, wherein the articulation ring of the sleeve element allows the free end of the elongate pivot limited axial mobility because of the articulation ring's sufficient capacity for shear.

21. A system comprising a plate having at least one hole and a fastener as claimed in claim 1, wherein the fastener is mounted within the at least one hole of the plate.

22. A building comprising a glazing including the system as claimed in claim 21.

23. A system comprising a plate having at least one hole and a fastener as claimed in claim 10, wherein the fastener is mounted within the at least one hole of the plate.

24. A building comprising a glazing including the system as claimed in claim 23.

25. A system comprising a plate having at least one hole and a fastener as claimed in claim 19, wherein the fastener is mounted within the at least one hole of the plate.

26. A building comprising a glazing including the system as claimed in claim 25.

27. A fastener for plates, comprising:

an elongate pivot configured to be fixed to a framework and having a free end and a hollow housing configured to house the free end in a moveable way;

an articulation element configured to pivotably support the elongate pivot in the hollow housing to allow tilting movements of a longitudinal axis of the elongate pivot in the hollow housing;

the articulation element includes a cylindrical sleeve element with at least one elastically deformable component and an internal sleeve provided therein, in which the free end of the elongate pivot can be moved axially with minimal radial clearance and can be guided in pivoting with elastic deformation of the elastically deformable component, wherein the cylindrical sleeve element and the internal sleeve are provided as concentric outer and inner bushings, respectively.

28. A fastener for plates, comprising:

an elongate pivot configured to be fixed to a framework and having a free end and a hollow housing configured to house the free end in a moveable way;

an articulation element configured to pivotably support the elongate pivot in the hollow housing to allow tilting movements of a longitudinal axis of the elongate pivot in the hollow housing;

wherein the articulation element includes a spherical element pivotably mounted and provided with a bore by way of the hollow housing, in which bore the free end of the elongate pivot is supported with axial sliding with minimal radial play, wherein provided inside the bore of the articulation element are elastic elements configured to adjust the free end of the elongate pivot into a neutral position in an axial direction of the elongate pivot, and wherein the elastic elements are arranged one on each side of an end head of the elongate pivot and each elastic element bears against the end head at a first side.

29. The fastener as claimed in claim 28, wherein second sides of the elastic elements bear, in a case of one of the elastic elements, against a closed end of the hollow housing and, in a case of another elastic element, against an annular shoulder surrounding the elongate pivot.

30. The fastener as claimed in claim 28, wherein second sides of the elastic elements bear against an inside of the bore.

31. A fastener for plates, comprising:

an elongate pivot configured to be fixed to a framework and having a free end and a hollow housing configured to house the free end in a moveable way;

an articulation element configured to pivotably support the elongate pivot in the hollow housing to allow tilting movements of a longitudinal axis of the elongate pivot in the hollow housing;

wherein the articulation element includes a sleeve element with at least one elastically deformable component and an internal sleeve, in which the free end of the elongate pivot can be moved axially with minimal radial clearance and can be guided in pivoting with elastic deformation of the elastically deformable component, wherein provided inside a bore of the articulation element are elastic elements configured to adjust the free end of the elongate pivot into a neutral position in an axial direction of the elongate pivot, and wherein the elastic elements are arranged one on each side of an end head of the elongate pivot and each elastic element bears against the end head at a first side.

32. The fastener as claimed in claim 31, wherein second sides of the elastic elements bear, in a case of one of the elastic elements, against a closed end of the hollow housing and, in a case of another elastic element, against an annular shoulder surrounding the elongate pivot.

33. The fastener as claimed in claim 31, wherein second sides of the elastic elements bear against an inside of the bore.

* * * * *